United States Patent [19]

Pinnavaia et al.

[11] Patent Number: 4,621,070
[45] Date of Patent: Nov. 4, 1986

[54] PILLARED INTERLAYERED CLAYS AND METHOD OF PREPARATION

[75] Inventors: Thomas J. Pinnavaia, Lansing, Mich.; Ivy D. Johnson, Mt. Laurel, N.J.

[73] Assignee: Michigan State University, East Lansing, Mich.

[21] Appl. No.: 805,320

[22] Filed: Dec. 2, 1985

[51] Int. Cl.[4] .......................... B01J 21/16; B01J 20/16
[52] U.S. Cl. ...................................... 502/63; 502/80; 502/84; 502/527
[58] Field of Search ...................... 502/63, 80, 84, 527

[56] References Cited

U.S. PATENT DOCUMENTS

| | | | |
|---|---|---|---|
| 3,944,505 | 3/1976 | La Croix | 502/527 |
| 4,122,041 | 10/1978 | Mahler | 502/527 |
| 4,176,090 | 11/1979 | Vaughan et al. | 502/84 |
| 4,216,188 | 8/1980 | Shabrai et al. | 423/118 |
| 4,238,364 | 12/1980 | Shabtai | 502/65 |
| 4,241,035 | 12/1980 | Farmer | 423/327 |
| 4,248,739 | 2/1981 | Vaughan et al. | 502/84 |
| 4,252,779 | 2/1981 | Farmer | 423/327 |
| 4,271,043 | 6/1981 | Vaughan et al. | 502/80 |
| 4,394,253 | 7/1983 | Van Nordstrand | 208/251 H |
| 4,410,751 | 10/1983 | Shin et al. | 502/84 |
| 4,419,273 | 12/1983 | Santilli et al. | 502/80 |
| 4,436,832 | 3/1984 | Jacobs et al. | 502/84 |
| 4,446,244 | 5/1984 | Van Nordstrand | 502/84 |
| 4,452,910 | 6/1984 | Hopkins et al. | 502/84 |
| 4,465,892 | 8/1984 | Jacobs et al. | 585/666 |

Primary Examiner—Carl F. Dees
Attorney, Agent, or Firm—Stefan J. Klauber

[57] ABSTRACT

Imogolite-2:1 layered silicate clay complex comprising imogolite tubes intercalated between the layers of the host clay.

17 Claims, 8 Drawing Figures a. INTERCALATED IMOGOLITE TUBES STACKED IN THE INTERLAYERS IN LOG-LIKE FASHION

PILLARED INTERLAYERED CLAYS AND METHOD OF PREPARATION

FIELD OF THE INVENTION

This invention relates to pillared interlayered clays such as those where the host clay belongs to the smectite group, and to a method of preparing them. More particularly, it relates to the use of a novel pillaring or intercalating means whereby novel high surface area, high basal spacing layered silicate-intercalation complexes are formed.

BACKGROUND OF THE INVENTION

As described in U.S. Pat. Nos. 4,436,832 or 4,465,892 certain clays have an expandable network structure. They have the property of being able to adsorb especially water between the individual layers of which they are made up. This is true especially of the smectite group of clays. These clays have a structure which may be defined, in a simplified manner, as a three-sheet structure comprising two single sheets of $SiO_4$ tetrahedrons and a dioctahedral or trioctahedral intermediate sheet of a hydrous metal oxide such as alumina or magnesia.

It is well known that the specific surface of a support is a very important factor in catalysis, and because of their property of being expandable, these clays might be used as catalysts or supports for catalysts, especially for the conversion of hydrocarbons. However, once expanded, in other words, after having adsorbed water between their individual layers, these clays have the drawback of losing their expanded character when heated to 100° C., and consequently of not retaining the increase in specific surface which may result from their expansion.

It should be noted that the state of expansion of a clay is defined by the interlayer spacing and the basal spacing, which are measured by X-ray diffraction.

As its name implies, the interlayer spacing is the spacing between two layers. In the unexpanded state of the dried clay, it is zero.

The basal spacing, represented by the symbol $d_{001}$, is defined as the sum of the thickness of a layer and the interlayer spacing.

In the case of montmorillonite, the thickness of a layer is 9.6 angstrom units. In the expanded state, the interlayer spacing may be as much as about 10 angstrom units, and the basal spacing may therefore be as much as about 20 angstrom units.

With a view to using expanding clays as catalyst supports or as catalysts, it has been sought to obtain clays having a maximum basal spacing that can be maintained when the clay is subjected to a heat treatment.

Thus, it has been found that pillars or bridges can be inserted between the clay layers to obtain pillared interlayered clays.

One well-known method consists in introducing between the clay layers, pillars formed by oligomers of a metal hydroxide, and in particular of an aluminum hydroxide, see U.S. Pat. No. 4,238,364.

In U.S. Pat. No. 4,452,910, a chromium oligomer is used. Other disclosures in this area are:
U.S. Pat. No. 4,176,090
U.S. Pat. No. 4,271,043
U.S. Pat. No. 4,248,739
U.S. Pat. No. 4,410,751
U.S. Pat. No. 4,216,188.

As explained in U.S. Pat. No. 4,452,910, in such methods the clay is treated with, e.g. hydroxy-aluminum polymers or oligomers in solution and the clay is dried and calcined to produce the supporting pillars between clay layers. These pillars maintain the expanded layer state in the clay and leave porosity framed by the pillars and the expanded layers. As reported in the patent, in smectite clays these resulting pores have a rectangular-type opening due to this framing by the pillars and clay layers.

Further, it is describe in U.S. Pat. No. 4,238,364 that interest in molecular sieve systems has been primarily concerned with the structure, properties, and application of natural and synthetic zeolites. Appropriately modified zeolites have gained importance as adsorbents in separation of industrial mixtures, or as catalysts for certain types of organic processes such as cracking, hydrocracking, isomerization, hydroisomerization, alkylation and dealkylation of simple aromatics, etc. However, it has been realized that there are certain severe limitations in the catalytic application of zeolites. In particular, due to the narrow range of critical pore sizes found in such systems (approximately 3–10Å) intrasorption and reaction of bulky or even medium-sized organic molecules is impossible. For instance, it has been demonstrated that most of the molecules present in raw coal liquids cannot penetrate into the intracrystalline pores of conventional zeolite catalysts. Furthermore, certain organic substrates, including monocyclic aromatic compounds, have exhibited low intracrystalline diffusivity in zeolite media, resulting in poor recoveries and fast catalyst aging. Therefore, it is said to be highly desirable to prepare molecular sieve catalysts with expanded pore size which permit admission and free diffusion of large hydrocarbon and other molecules in the intracrystalline pore system. In the said patent, the oligomer is aluminum hydroxide and is used only in sufficient amount to partially cross-link or bridge the smectite layers so as to obtain lateral distances in the interlayer space of about 8Å to 30Å to increase pore size.

However, as will be shown in the ensuing description, a further effect in increasing pore size may be achieved by using another approach, viz., by markedly increasing the interlayer free spacing, also termed the gallery height, to hitherto unobtainable values for a pillared clay so that the products of the invention are highly suitable for use in catalytic processes involving the treatment of large molecules.

Of interest also is U.S. Pat. No. 4,241,035 which describes the synthesis of an inorganic material resembling the natural product, imogolite. See also U.S. Pat. No. 4,252,779.

U.S. Pat. No. 4,394,253 discloses a catalyst composition which includes two essential components: dispersed rods of fibrous form imogolite, and an inorganic oxide gel for bonding the rods. The inorganic oxide provides a rigid link between the imogolite rods, which are randomly oriented in a three-dimensional mutual orientation. The resulting rigid skeletal framework is said to provide a catalyst body with high crush strength and attrition resistance. A discussion of the inorganic oxide gels is given at col. 3, line 57 to col. 4, line 7. The patentee emphasizes that the imogolite rods are randomly (not systematically) oriented. Proper blending of the components is stated to be important to obtain the so described advantageous physical properties in the final catalyst. It is evident that the compositions are not pillared. See also U.S. Pat. No. 4,446,244.

SUMMARY OF THE INVENTION

According to the invention, a pillared, interlayered clay product is prepared in which a tubular structured aluminosilicate forms the pillars between the layers of the clay, by contacting an aqueous slurry of a clay selected from the group consisting of smectites, vermiculite, hydromicas, fluorotetrasilicic mica, fluorophlogopite, fluorohectorite and related swelling 2:1 layered silicate clays with an aqueous solution of a tubular structured aluminosilicate and recovering the pillared interlayered clay. The tubular aluminosilicate is preferably imogolite or an imogolite-like product. There thus results a pillared clay comprising a host clay selected from said group, intercalated with a tubular aluminosilicate, e.g. imogolite.

Thus, a new, high surface area inorganic complex has been prepared which consists of a tubular aluminosilicate (imogolite) intercalated between the layers of a smectite clay (eg., montmorillonite). The product is prepared by slowly adding a dilute, for example, a 1.0 wt % slurry of clay (Na+-exchanged form) to a dilute (1 wt %) aqueous solution of synthetic imogolite. The product may also be prepared by adding the dilute, aqueous solution of imogolite dropwise to the clay slurry. The complexes represent a unique way of supporting imogolite for catalytic and adsorption applications. The complexes also represent a new type of pillared clay with basal spacings in the range of about 35-44 Å as demonstrated in the Figures.

Imogolite is a tubular silicate with an external diameter of 21-23 Å and an internal diameter of approximately 9Å. It is a known catalyst for hydrogen treating of hydrocarbons, (see U.S. Pat. No. 4,394,253). However, the pure state of the compound is a fine powder consisting of aggregated bundles of imogolite tubes. This extensive aggregation of bundles is undesirable in conventional reactors. Thus, the compound must be supported on a suitable carrier. The present invention affords a unique method of dispersing the imogolite tubes on a bundle-by-bundle and tube-by-tube level by intercalation in a layered silicate. Only a small fraction, <5% as judged by electron microscopy, of the immobilized tubes are in the form of non-intercalated bundles of tubes.

The imogolite-smectite complexes represent a new kind of pillared clay, see U.S. Pat. Nos. 4,176,090 and 4,216,188. Typically, pillared clays are complexes formed by intercalation of polyoxycations in smectite clays. The new complexes represent the first examples of a tubular silicate intercalated in a smectite clay and represent the highest basal spacing (35 to 44 Å) observed to date for a pillared clay.

Imogolite is known to have a small anion exchange capacity, suggesting that a net positive charge can exist in the tubular structure. (B. K. G. Theng, M. Russell, G. J. Churchman, R. L. Parfitt, Clays Clay Miner., 30, 143 (1982)). Also, the external surface of imogolite can be made positive by protonation at pH values less than 9.0 (Y. Horikawa, Clay Science, 4, 255 (1975)). Smectite clay layers are negatively charged. Thus the imogolite tubes should intercalate in smectite clays by electrostatic binding to the basal surfaces of the clay.

It is preferred to use synthetic imogolite in order to have available a highly dispersed dilute slurry during the course of the process. The natural material tends to have the tubular constituents intertwined as a result of hydration and it is difficult to achieve the dispersion of those tubes that is desirable for carrying out the process.

The clay may be selected from the groups shown below:

(a) Any clay mineral in the smectite family of swelling clays can serve as the layer host structure (montmorillonite, saponite, beidellite, nontronite, hectorite, and related 2:1 layered silicates);

(b) any synthetic analogs of the above minerals, including fluorohectorites, laponite, hydromica, fluorotetrasilicic mica, fluorophlogopite, and related derivatives may be used as the host clay; oftentimes these synthetic derivatives have anhydrous unit cell compositions not found for naturally occurring minerals. Typical examples include $M^{n+}{}_{0.4/n}$ [$Mg_{5.6}Li_{0.4}$] $Si_8O_{20}X_4$ ($M^{n+}$=gallery cation, X=OH and/or F); $M^{n+}{}_{1.8/n}$ [$Mg_{4.2}Li_{1.8}$] $Si_8O_{20}X_4$; $M^{n+}{}_{2/n}$ $Mg_5$ $Si_8O_{20}F_4$; $M^{n+}{}_{2/n}$ $Mg_6Al_2Si_6O_{20}F_4$.

(c) the natural and synthetic forms of vermiculite containing interlayer cations which permit substantial interlayer swelling in a manner analogous to a smectite clay, may be used. Such interlayer cations include Li, n-butylammonium, n-propylammonium and n-pentylammonium cations.

BRIEF DESCRIPTION OF THE DRAWINGS

Characteristic XRD (X-ray diffraction) patterns for products prepared are shown in FIGS. 1-6 and 8.

DETAILED DESCRIPTION

Figure 1:
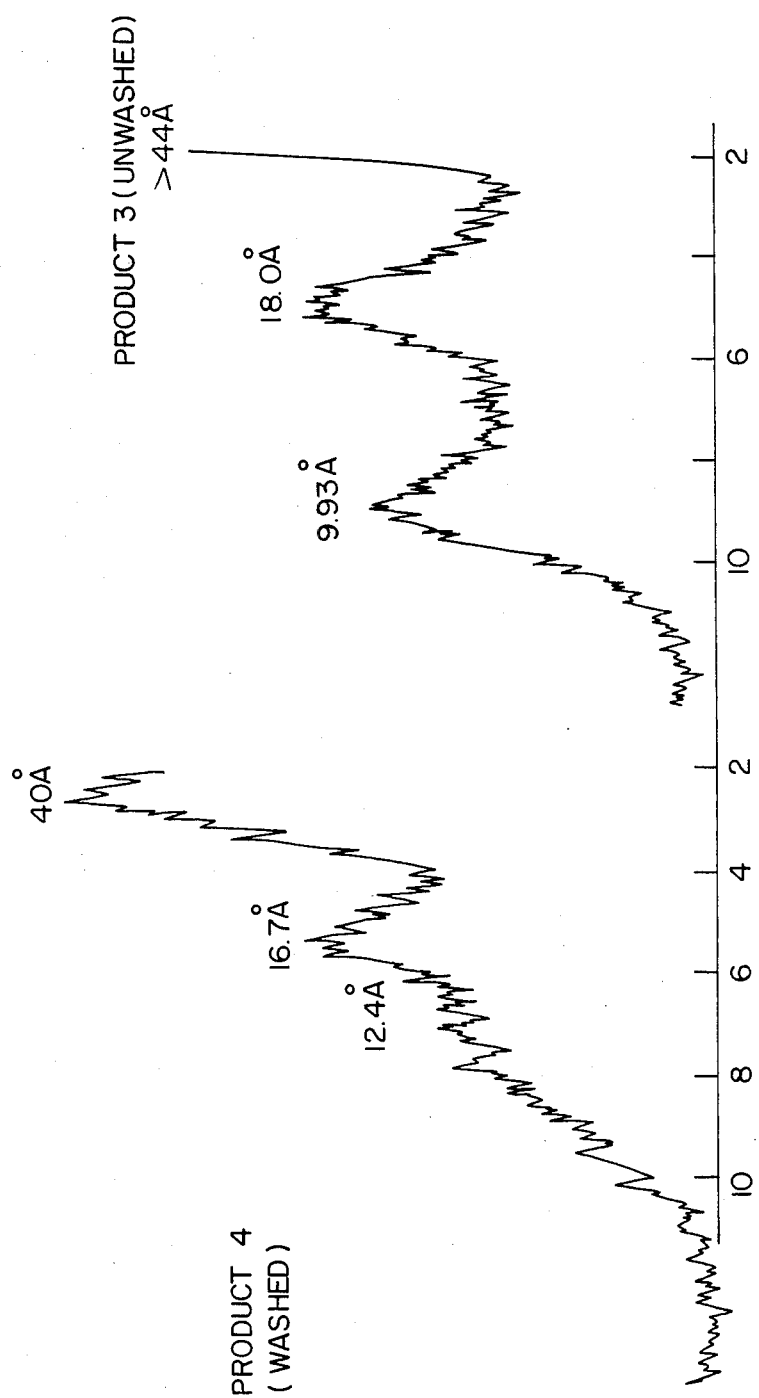
FIG. 1 compares the product of washed Example 4 with unwashed Example 3.
Figure 2:
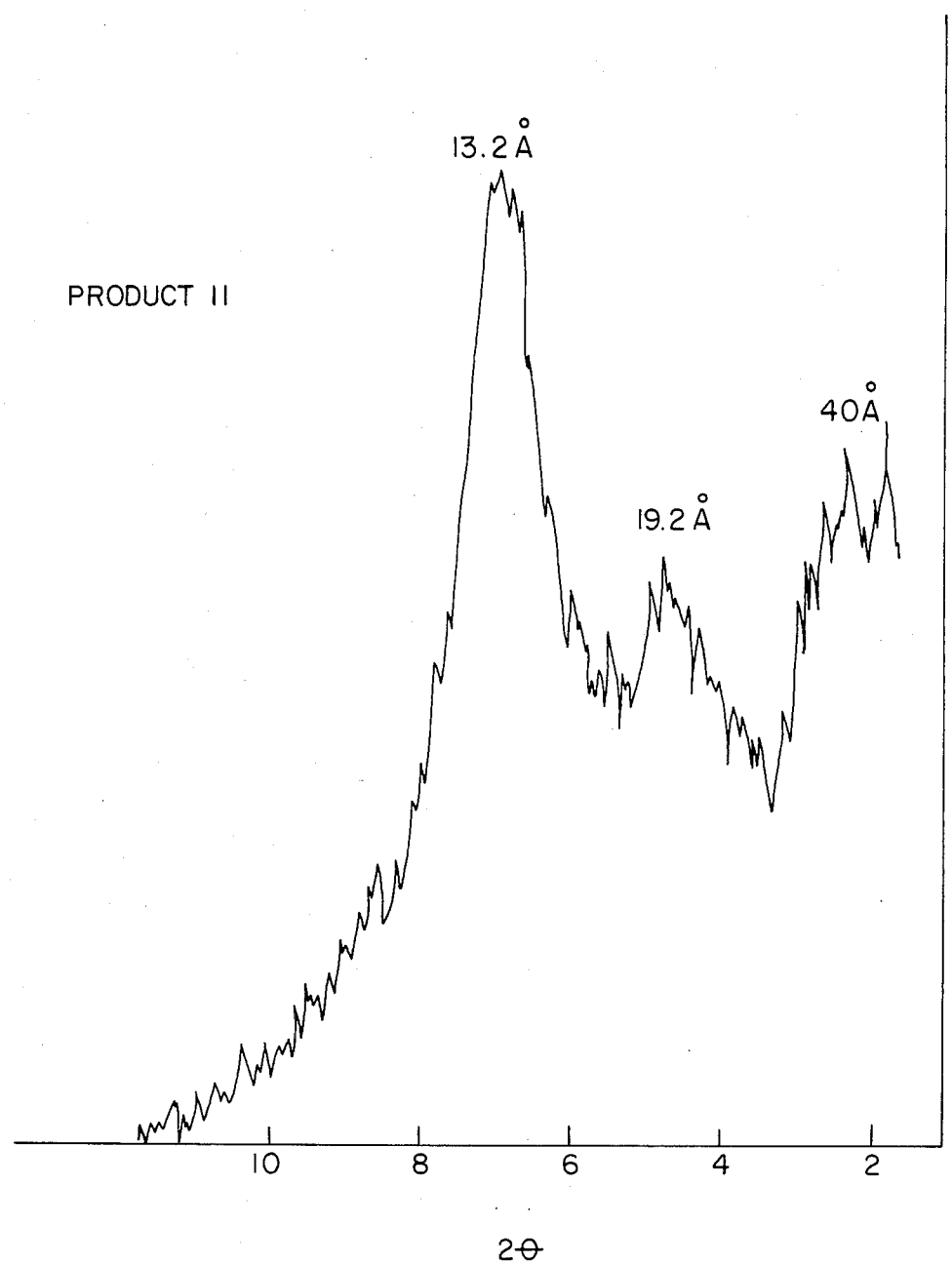
FIG. 2 represents the product of Example 11.
Figure 3:
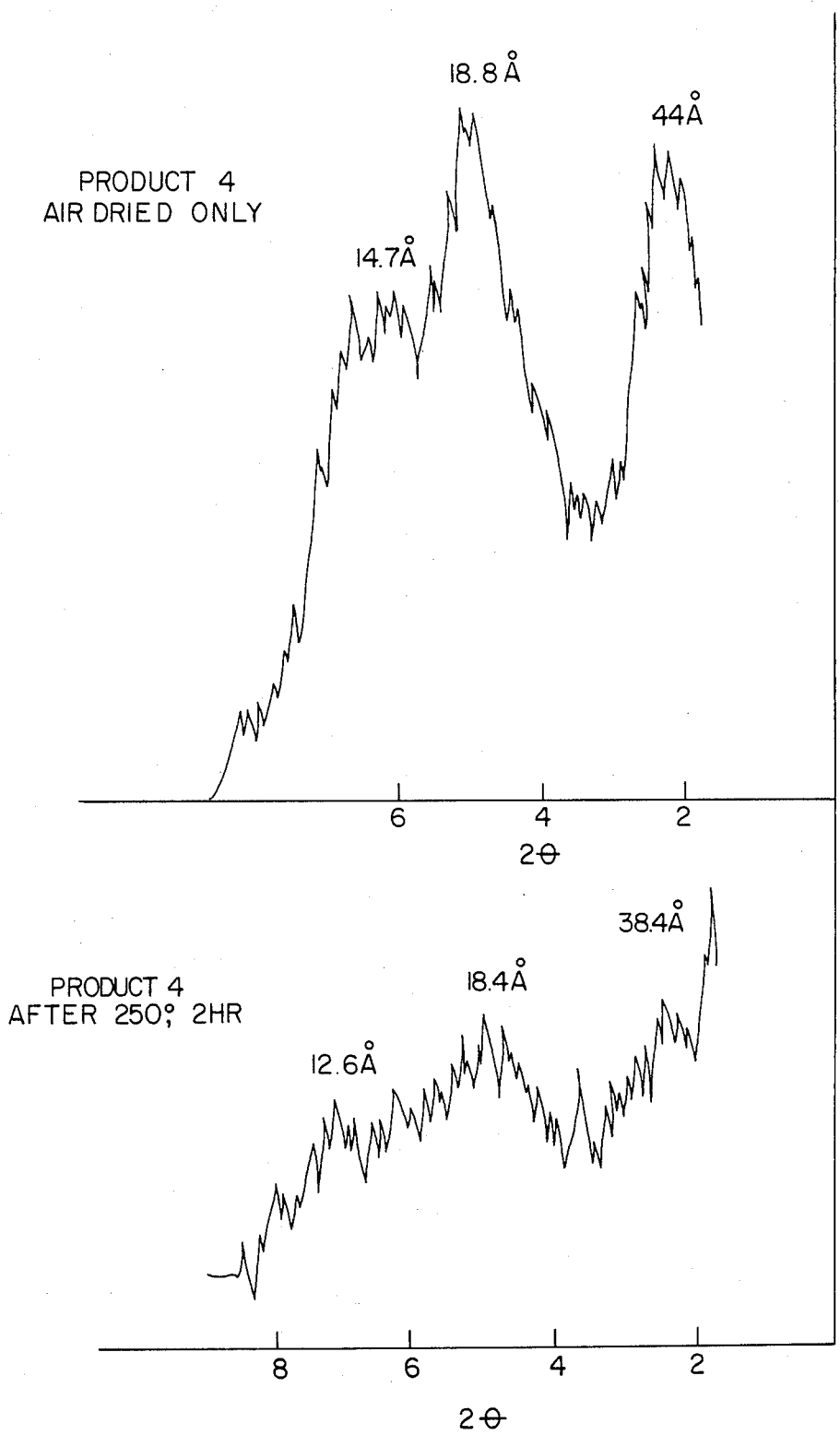
FIG. 3 compares the product of Example 4 before-/after the activation at 250° C. for 2 hours.
Figure 4:
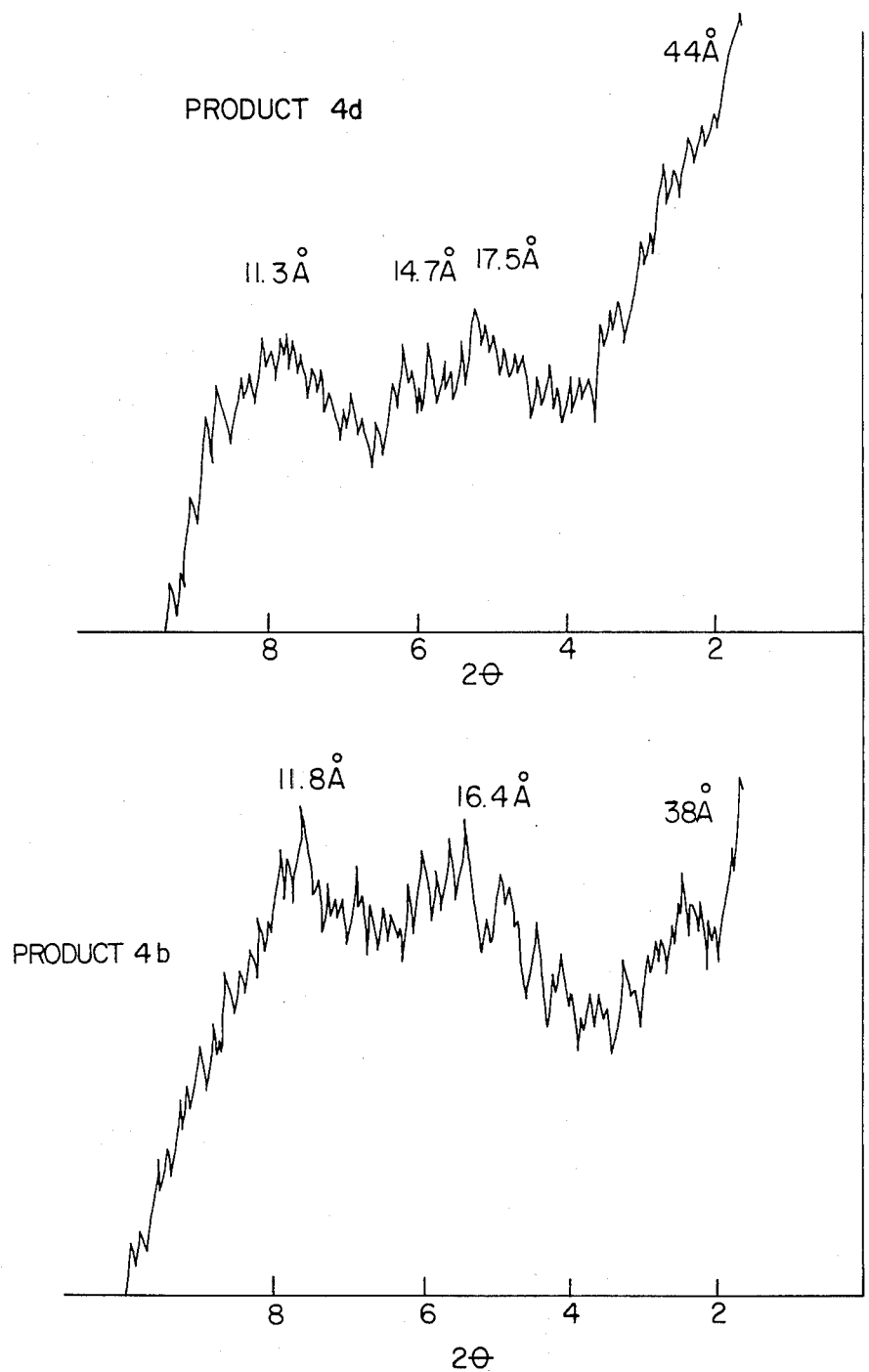
FIG. 4 compares the effect of different activation regimes in connection with Example 4 (see Table 2 below).
Figure 5:
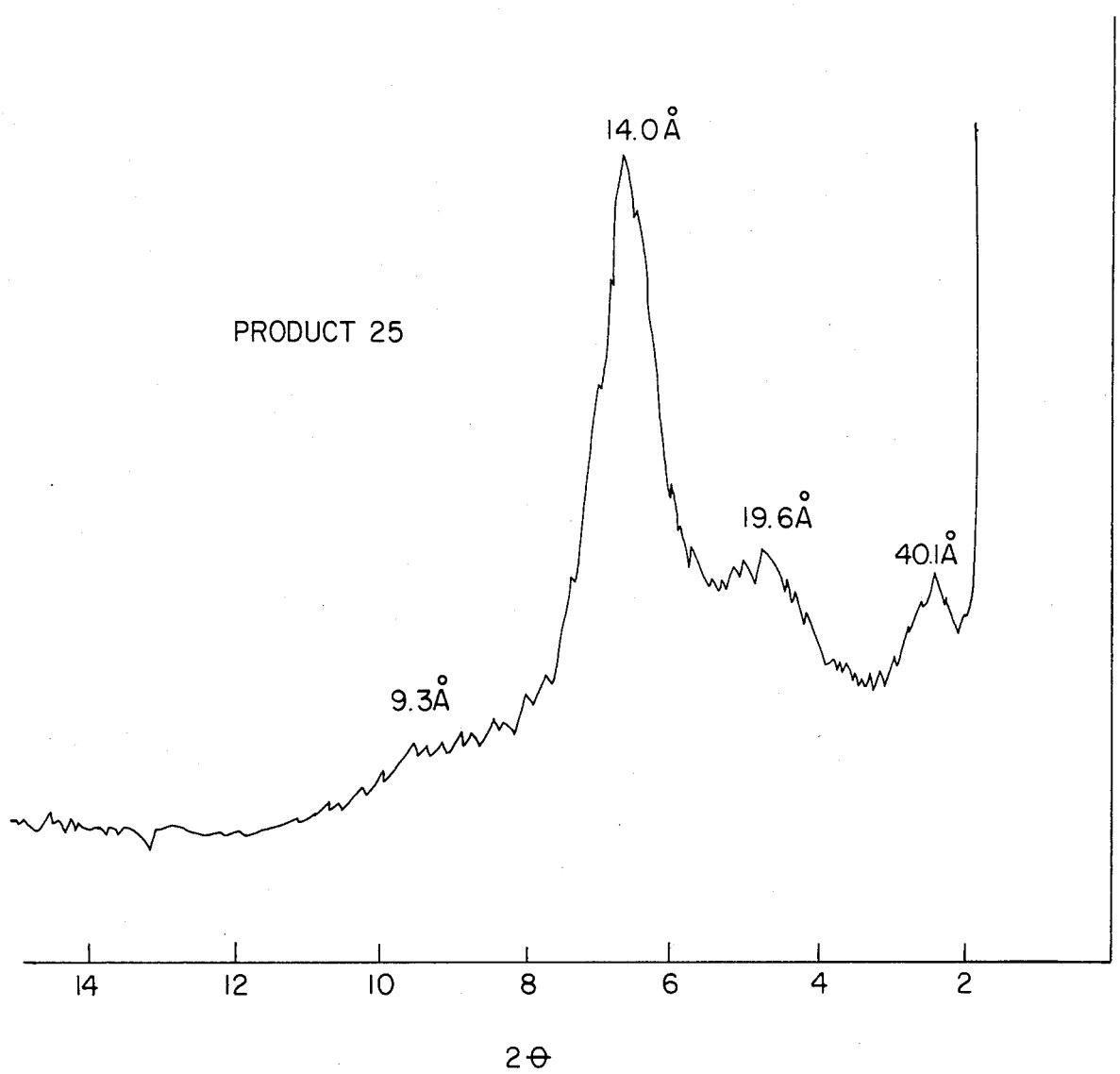
FIG. 5 represents the product of Example 25.

The following detailed description is intended as illustrative but not limitative of the invention.

Procedure

The new imogolite-smectite composition of matter now described consists of smectite clay intercalated with imogolite tubes. The clay used was Na-montmorillonite from Crook County, Wyo. A 1 wt % clay slurry was Na+-saturated with NaCl and then dialyzed to remove excess salt. The particle size less than or equal to 2 um was separated by sedimentation. The imogolite was synthesized by first preparing an aluminum solution consisting of 10 ml of aluminum s-butoxide in 300 ml of 75 mM HCLO$_4$. The solution was stirred vigorously for at least 6 hours, but not more than 12 hours, until the solution turned clear, (pH approximately 2.3). When aluminum s-butoxide hydrolysis was complete after 6-12 hours reaction time, 450 ml of deionized H$_2$O and 5 ml of Si(OEt)$_4$ were added sequentially to the aluminum solution. The final pH of the mixture was in the range of approximately 3–4. The pH of the vigorously stirred reaction mixture was adjusted to a value of 5.0 by the dropwise addition of 1.0 M NaOH. The solution was then immediately acidified with 1.0 M acetic acid to pH=3.5, (approximately 10 ml of acetic acid). The solution was then aged, e.g., heated between 95° C. and 97° C. while being stirred vigorously for a minimum of 1 day. In general, the imogolite solution may be aged by heating at temperatures in the range of about 90° to 100° C. for about 1 to 72 hours. The above method of preparing the imogolite solution was patterned after the procedure defined by V. C. Farmer and A. R. Fraser, Dev. Sedimentology, 27, 547 (1978).

The new imogolite-smectite complex was synthesized by the slow, dropwise addition of the 1 wt % $Na^+$-montmorillonite suspension to the approximately 1 wt % imogolite solution. The ratio of imogolite to clay was 2.5:1 by weight. The complex can also be synthesized by a dropwise addition of the imogolite solution into the clay with the same ratio of components. The solution was stirred for 3–12 hours. The final pH was approximately 3.3. The product was washed a minimum of three times by centrifuging the suspension and discarding the supernate. The final pH after washing was 4.0. The material was air-dried on glass plates under ambient conditions.

The clay host used to prepare the imogolite-clay complex may be any member of the smectite family of clays. Also, synthetic smectites and related derivatives (eg., fluorohectorite and laponite) may be used as the source of smectite clay.

Table 1 gives the chemical composition and BET surface area of products prepared by procedures generally similar to the synthetic procedure described above. Surface areas of about 200–480 $m^2/g$ are obtainable.

BET surface areas were measured, as is conventional, after pretreatment, i.e., activation, of the products at elevated temperatures in an inert atmosphere, e.g., argon.

BET surface areas as a function of different pretreatment temperatures are provided in Table 2. For this measurement, the product of Example 4 was used, heat treatment under various conditions being applied.

Characteristic XRD patterns (Cu $K_\alpha$) for related products are given in FIGS. 1–5.

The cation exchange capacity and grain densities were determined for the product of Example 5 defined in Table 1. The value of the CEC as determined by $NH_4^+$ uptake (Kjeldahl analysis) was 46.5 meq/100 g. The grain density determined by He pycnometry was 2.712.

TABLE 1

Imogolite-Smectite Intercalation Complexes

| Example No. | Clay Host | Reaction Time (hrs) | No. Washes | Composition, Wt. %[e] | | | | | Surface Area $m^2/g$ |
|---|---|---|---|---|---|---|---|---|---|
| | | | | $SiO_2$ | $Al_2O_3$ | MgO | $Na_2O$ | $Fe_2O_3$ | |
| 1 | $Na^+$—Mont[a] | 3 | 3 | 48.28 | 31.67 | 1.38 | — | 2.50 | 287[1] |
| 2 | $Na^+$—Mont[a] | 3 | 0 | — | — | — | — | — | 10.6[1] |
| 3 | $Na^+$—Mont[a] | 3 | 0 | — | — | — | — | — | 8.7[1] |
| 4 | $Na^+$—Mont[a] | 3 | 5 | — | — | — | — | — | 258[1] |
| 5 | $Na^+$—Mont[a] | 20 | 5 | — | — | — | — | — | — |
| 6 | $Na^+$—Mont[a] | 20 | * | 45.16 | 28.74 | 1.40 | — | 2.46 | 221[2] |
| 7 | $Na^+$—Mont[a] | 12 | 1 | 42.70 | 28.86 | 1.311 | 0.6118 | 2.124 | 183[2] |
| 8 | $Na^+$—Mont[a] | 12 | 3 | 44.88 | 28.40 | 1.305 | — | 2.24 | 240[2] |
| 9 | $Na^+$—Mont[a] | 12 | 5 | 42.67 | 28.94 | 1.297 | — | 2.286 | 188[2] |
| 10 | $Na^+$—Mont[a] | 12 | 6 | 49.94 | 35.13 | 1.516 | — | 3.72 | 291[2] |
| 11 | $Na^+$—Mont[a] | 12 | 7 | 47.07 | 33.58 | 1.49 | — | 2.64 | 235[2] |
| 12 | $Na^+$—Mont[a] | 12 | 10 | 47.36 | 33.87 | 1.45 | — | 2.564 | 230[2] |
| 13 | $Na^+$—Mont[a] | | 15 | — | — | — | — | — | 238[2] |
| 14 | $Na^+$—Mont[b] | 2 | 0 | 32.94 | 25.86 | 0.7799 | 1.41 | 5.34 | — |
| 15 | $Na^+$—Mont[b] | 2 | 3 | 45.24 | 28.90 | 1.186 | — | 2.25 | — |
| 16 | $Na^+$—Mont[b] | 2 | 5 | 46.08 | 28.80 | 1.231 | 0.04 | 2.34 | — |
| 17 | Laponite[c] | 3 | 1 | 46.63 | 27.37 | 12.94 | 0.07 | — | 428[2] |
| 18 | Laponite[c] | 3 | 3 | 46.97 | 27.38 | 13.11 | 0.08 | — | 430[2] |
| 19 | Laponite[c] | 3 | 5 | 49.36 | 28.57 | 13.80 | 0.05 | — | 480[2] |
| 20 | Laponite[c] | 3 | 7 | 45.42 | 27.51 | 13.02 | — | — | 483[2] |
| 21 | Laponite[c] | 3 | 10 | | | | | | 439[2] |
| 22 | F—Hectorite[d] | 3 | 1 | 46.85 | 23.51 | 13.16 | 3.56 | — | 72[2] |
| 23 | F—Hectorite[d] | 3 | 3 | — | — | — | — | — | 27.9[2] |
| 24 | F—Hectorite[d] | | 5 | — | — | — | — | — | [2] |
| 25 | F—Hectorite[d] | | 7 | 50.18 | 24.56 | 14.20 | 3.84 | — | 50[2] |

Footnotes for Table 1
[a]Wyoming Montmorillonite: 53.9% $SiO_2$, 18.25% $Al_2O_3$, 2.60% MgO, 2.30% $Na_2O$, 3.72% $Fe_2O_3$.
[b]Wyoming Montmorillonite: 62.38% $SiO_2$, 21.06% $Al_2O_3$, 2.39% MgO, 2.60% $Na_2O$, 4.26% $Fe_2O$.
[c]Laponite-RD (Laporte): 51.98% $SiO_2$, 0.16% $Al_2O_3$, 26.73% MgO, 4.59% $Na_2O$.
[d]Fluorohectorite: 64.00% $SiO_2$, 23.66% MgO, 6.40% $Li_2O$.
[e]Chemical compositions are average of at least three independent determinations and sometimes five determinations.
[1]Pretreatment temperature 250° C., 2 hrs.
[2]Pretreatment temperature 350° C., 3 hrs.
*Product washed by dialysis.

TABLE 2

Surface Area Dependence on Pretreatment (Activation) Conditions#

| Sample | Activation Temp °C./hrs.** | $m^2/g$* |
|---|---|---|
| 4 | 250/2 | 258 |
| 4a | 250/4 | 210 |
| 4b | 350/2 | 384 |
| 4c | 350/18 | 183 |
| 4d | 500/2 | 338 |
| 4e | 500/4 | 236 |

The host clay was the Wyoming montmorillonite designated in footnote a of Table 1.
**Samples were activated under argon at the temperature and times shown.
*Three-point $N_2$ BET method.

Figure 6:
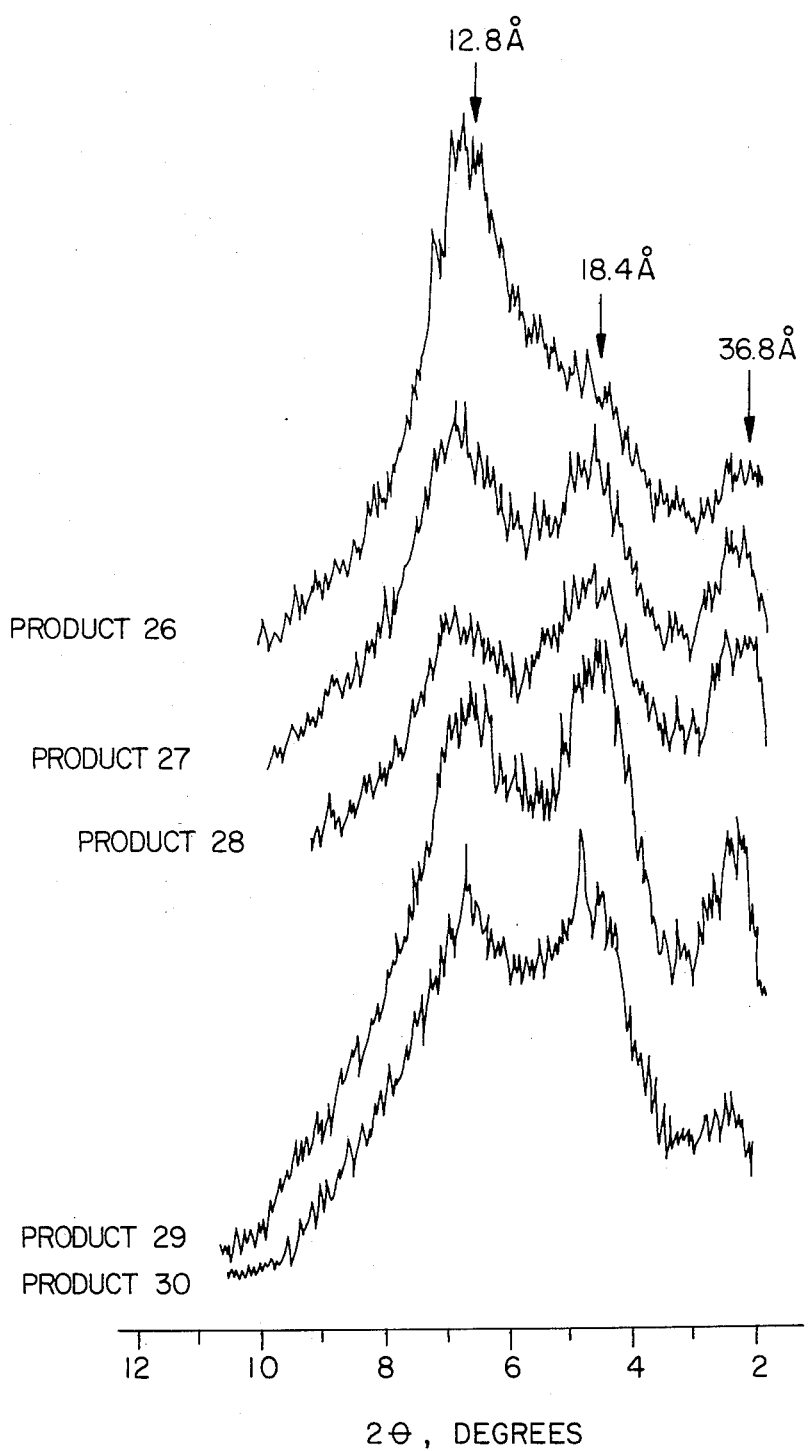
FIG. 6 represents the products of Examples 26-30.

In another series of examples, 26–30, of the synthesis of the novel imogolite-clay complexes, various amounts of an imogolite suspension were added to a stirred 30 ml suspension of Na+-montmorillonite. The concentrations of the imogolite and montmorillonite suspensions were 0.92 wt % and 0.70 wt %, respectively. The reaction mixtures were stirred 2.0 hr at 25° C. and the products were collected by centrifugation. Each product was washed four times by suspending in water and centrifuging. The products were then dried in air on glass slides. Table 3 provides the $N_2$ BET surface areas of products prepared by procedures generally similar to the synthetic procedure described above. FIG. 6 provides the X-ray diffraction pattern ($CuK_\alpha$) of the products prepared as films on glass slides.

TABLE 3

| Example No. | ml. Imogolite Suspension Added to 30 ml. of Mont.[a] | Surface Area $m^2/g$ |
|---|---|---|
| 26 | 10.0 | 255 |
| 27 | 15.0 | 200 |
| 28 | 20.0 | 137 |
| 29 | 25.0 | 110 |
| 30 | 30.0 | 55 |

[a]The concentrations of imogolite and montmorillonite suspensions used in the synthesis were 0.92 wt. % and 0.70 wt. %, respectively.

Figure 7:
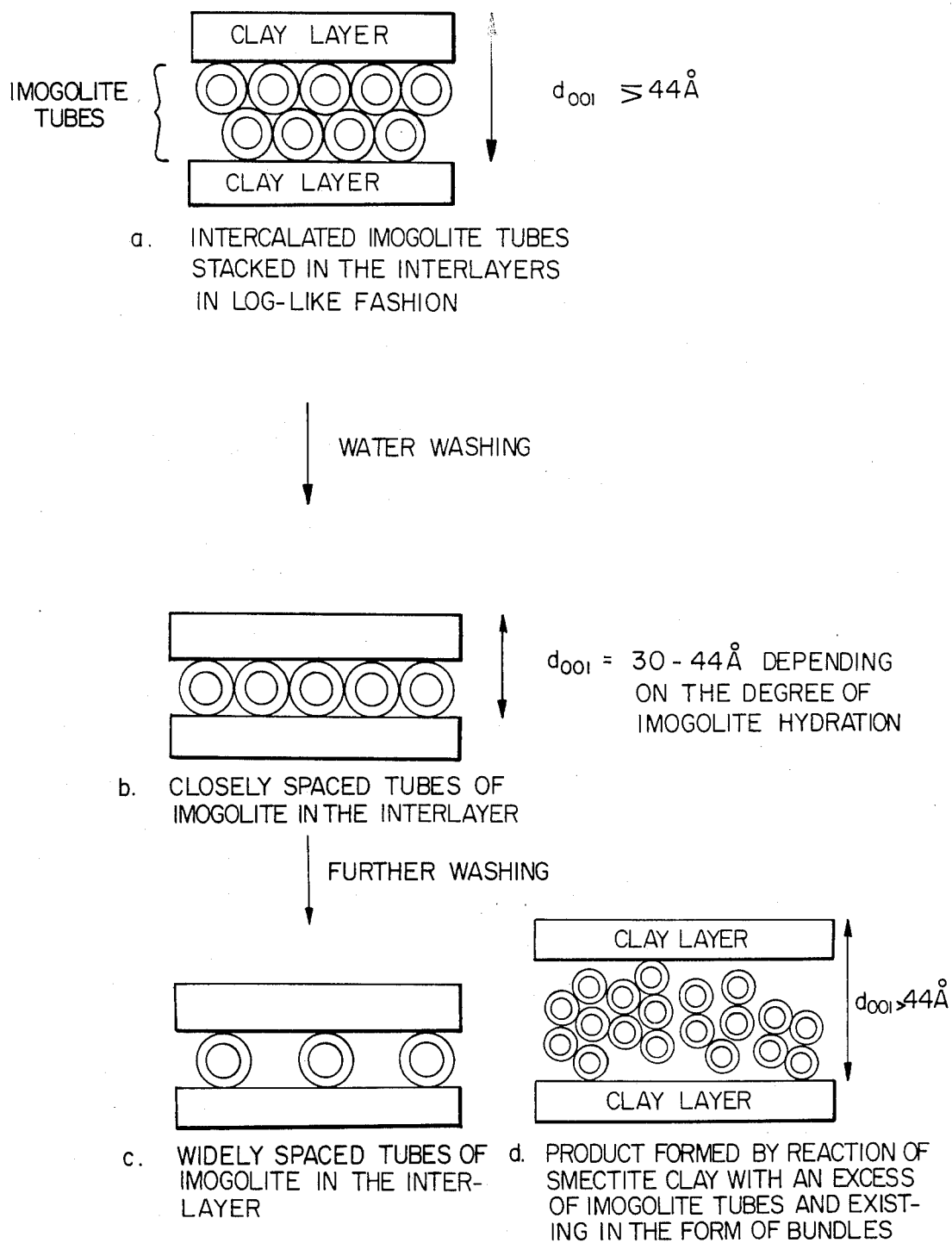
FIG. 7 is a schematic showing the probable organization of the imogolite tubes in the interlayer of the host clay at different levels of hydration, and for reaction of smectite clay with excess imogolite.

On the basis of observed X-ray patterns for unwashed, washed, and extensively washed products, the organization of the imogolite tubes in the interlayers of the host clay is schematically shown in FIG. 7a-c. FIG. 7d illustrates the product formed by reaction of smectite with an excess of imogolite tubes. This product also can be washed with water to form products analogous to those represented by FIG. 7a-c.

Figure 8:
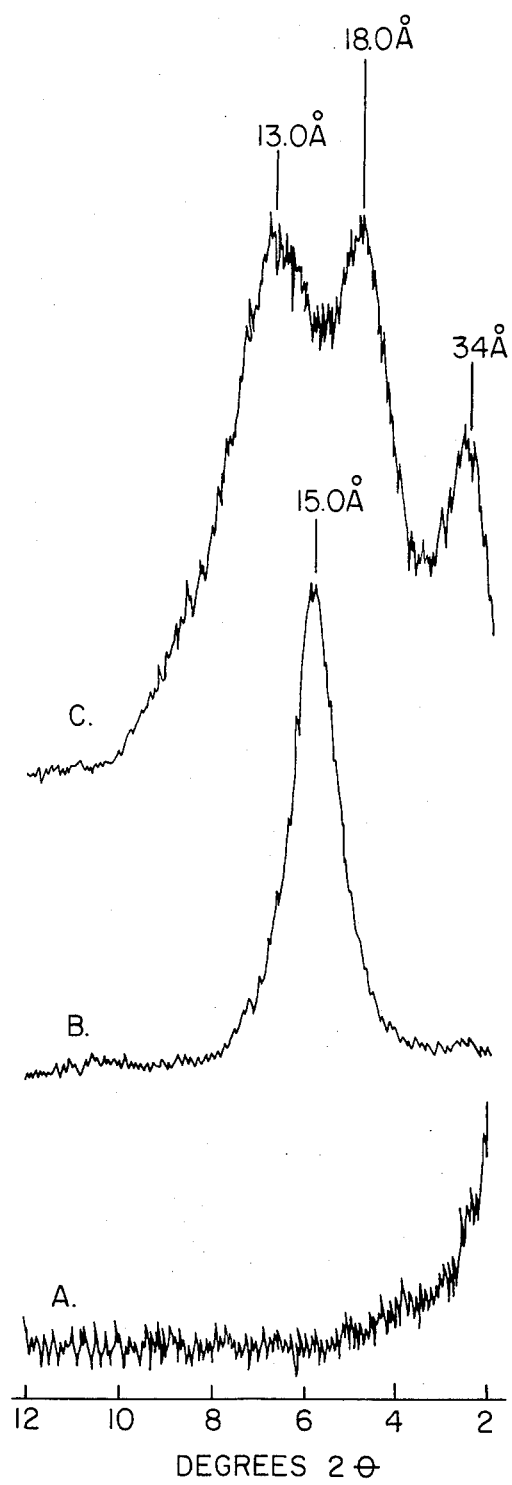
FIG. 8 compares the reaction product of montmorillonite and imogolite with a physical mixture of the two and with imogolite alone.

That the imogolite tubes are ordered in the clay galleries is demonstrated by the X-ray pattern ($CuK_\alpha$ in FIG. 8C for a complex prepared by the reaction of 40 ml of 0.72 wt. % montmorillonite and 40 ml of 0.92 wt. % imogolite solution for 2 hrs. followed by four washings and air drying. A physical mixture containing equivalent amounts of montmorillonite and imogolite shows mainly the diffraction peak of the clay (FIG. 8B). Pristine imogolite exhibits an essentially featureless pattern (FIG. 8A).

It will be understood that the examples used to illustrate the invention can be varied without departing from the scope of the invention and without sacrificing its chief advantages.

What is claimed is:

1. A method of preparing a pillared, interlayered clay product in which a tubular structured aluminosilicate forms the pillars between the layers of the clay, comprising the steps of contacting an aqueous slurry of a clay selected from the group consisting of smectites, vermiculite, fluorohectorite, hydromicas, fluorotetrasilicic mica, fluorophlogopite, and related swelling 2:1 layered silicate clays with an aqueous solution of a tubular structured aluminosilicate and recovering the pillared interlayered clay product.

2. The method as set forth in claim 1 in which the tubular structured aluminosilicate is imogolite.

3. The method as set forth in claim 2 in which synthetic imogolite is used.

4. The method as set forth in claim 3 in which the imogolite solution is aged at temperatures in the range of about 90° to 100° C.

5. The method as set forth in claim 3 in which the clay product is washed and dried.

6. The method as set forth in claim 3 in which the clay is used in the Na+ exchanged form.

7. The method as set forth in claim 3 in which the clay is a smectite.

8. A pillared clay selected from the group consisting of smectites, vermiculite, fluorohectorite, hydromicas, fluorotetrasilicic mica, fluorophlogopite, and related swelling 2:1 layered silicate clays, intercalated with a tubular structured aluminosilicate.

9. A product as set forth in claim 8 in which the aluminosilicate is imogolite or a synthetic imogolite-like product with a tube diameter of about 23 to about 26Å.

10. A product as set forth in claim 9 which exhibits a basal spacing ($d_{001}$) in the range of about 35 to about 44 angstrom units.

11. A product as set forth in claim 9 which has been washed with water and which exhibits a basal spacing ($d_{001}$) in the range of about 30 to about 44 angstrom units.

12. A product as set forth in claim 9 in which the intercalated imogolite tubes are substantially present as bundles with an intertube spacing in the range about 26 to about 44Å.

13. A product as set forth in claim 9 in which the intercalated imogolite tubes are substantially dispersed in a molecular, tube-by-tube manner.

14. A product as set forth in claim 13 in which less than 5% of the tubes are in the form of non-intercalated bundles of tubes.

15. A product as set forth in claim 9 in which the clay is a smectite.

16. A product as set forth in claim 9 having a surface area in the range of about 55 to about 480 square meters per gram.

17. An imogolite-2:1 layered silicate clay complex in which the imogolite is intercalated between the layers of the clay.

* * * * *